United States Patent [19]

Goolsby et al.

[11] 4,178,909
[45] Dec. 18, 1979

[54] SOLAR COLLECTOR

[75] Inventors: Patrick F. Goolsby, Richmond, Va.; David J. Laudig, Palos Verdes, Calif.; Paul A. Mechler, La Palma, Calif.; Steven J. Osterhus, Westminster, Calif.; George F. Swenck, Richmond, Va.

[73] Assignee: Reynolds Metals Company, Richmond, Va.

[21] Appl. No.: 901,300

[22] Filed: May 1, 1978

[51] Int. Cl.² .......................... F24J 3/02; E04B 1/00
[52] U.S. Cl. .................................. 126/417; 126/442; 52/222
[58] Field of Search ................ 126/270, 271; 52/273, 52/822, 823, 222

[56] References Cited

U.S. PATENT DOCUMENTS

| | | | |
|---|---|---|---|
| 1,790,861 | 2/1931 | Harvey | 160/368 R |
| 2,594,232 | 9/1947 | Stockstill | 126/121 X |
| 2,698,470 | 1/1955 | Buedingen | 52/822 X |
| 3,305,011 | 2/1967 | Smith, Jr. | 165/171 |
| 3,648,768 | 3/1972 | Scholl | 165/171 |
| 3,974,822 | 8/1976 | Patil | 126/271 |
| 4,018,211 | 4/1977 | Barr | 126/271 X |
| 4,018,260 | 4/1977 | Baslow | 52/273 X |
| 4,063,544 | 12/1977 | Bowen | 126/271 X |
| 4,074,706 | 2/1978 | Hajdu et al. | 126/271 |
| 4,080,956 | 3/1978 | Dawley | 126/271 |
| 4,084,579 | 4/1978 | Yu | 126/270 X |
| 4,092,977 | 6/1978 | Gurtler et al. | 126/270 |

FOREIGN PATENT DOCUMENTS 2305696 10/1976 France ............................ 126/271

OTHER PUBLICATIONS

*Modern Metals*, Mar. 1976, pp. 61–62, "Versatile Collector Plate Uses Contest Winning Fin and Tube Extrusion".

*Primary Examiner*—Samuel Scott
*Assistant Examiner*—Randall L. Green
*Attorney, Agent, or Firm*—Glenn, Lyne, Girard, Clark & McDonald

[57] ABSTRACT

A solar collector is provided comprising a cover assembly which employs a flexible polymeric cover sheet and means for stretching the cover sheet and maintaining it taut under various ambient temperature conditions, a simple and economical peripheral supporting structure, and support means for a solar heat exchanger of the solar collector which supports such heat exchanger in a high strength manner yet in thermally insulated relation.

17 Claims, 13 Drawing Figures

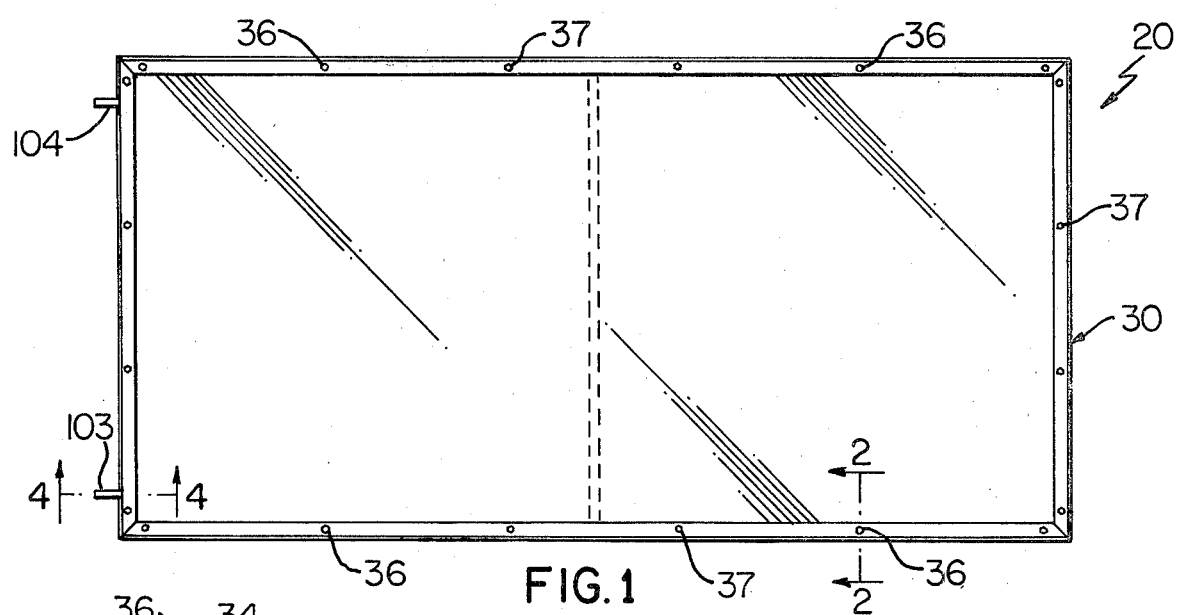
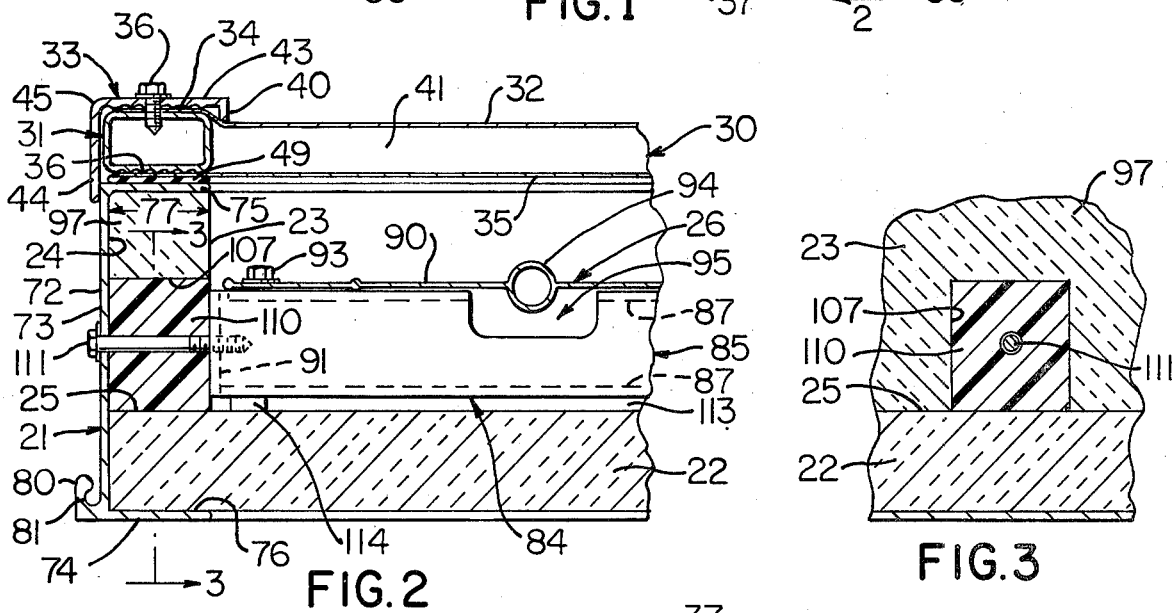
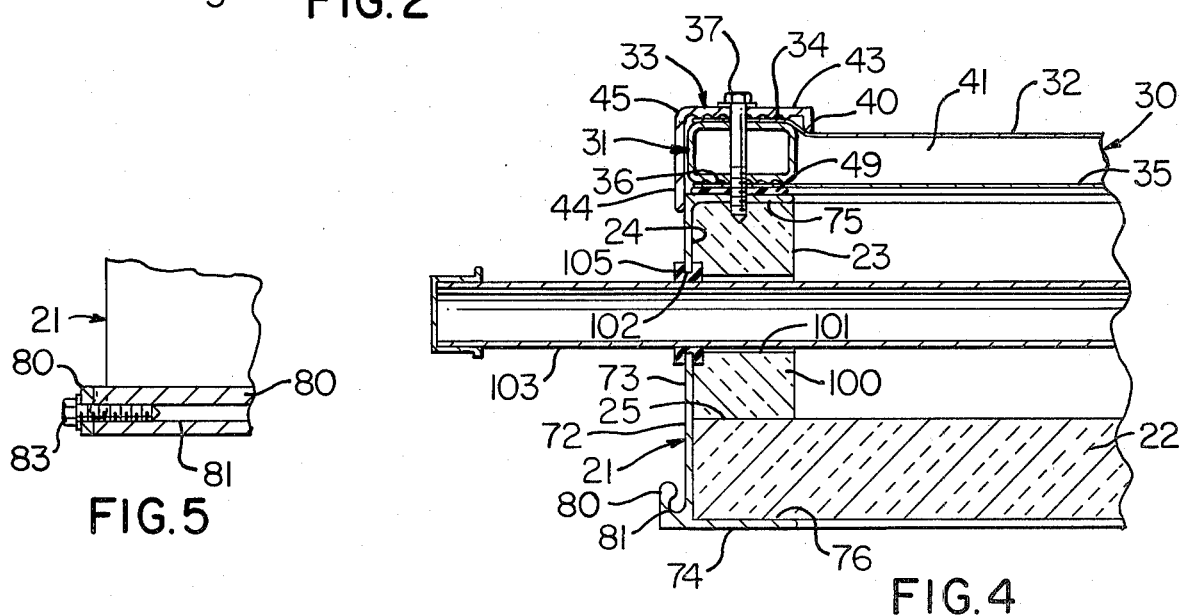

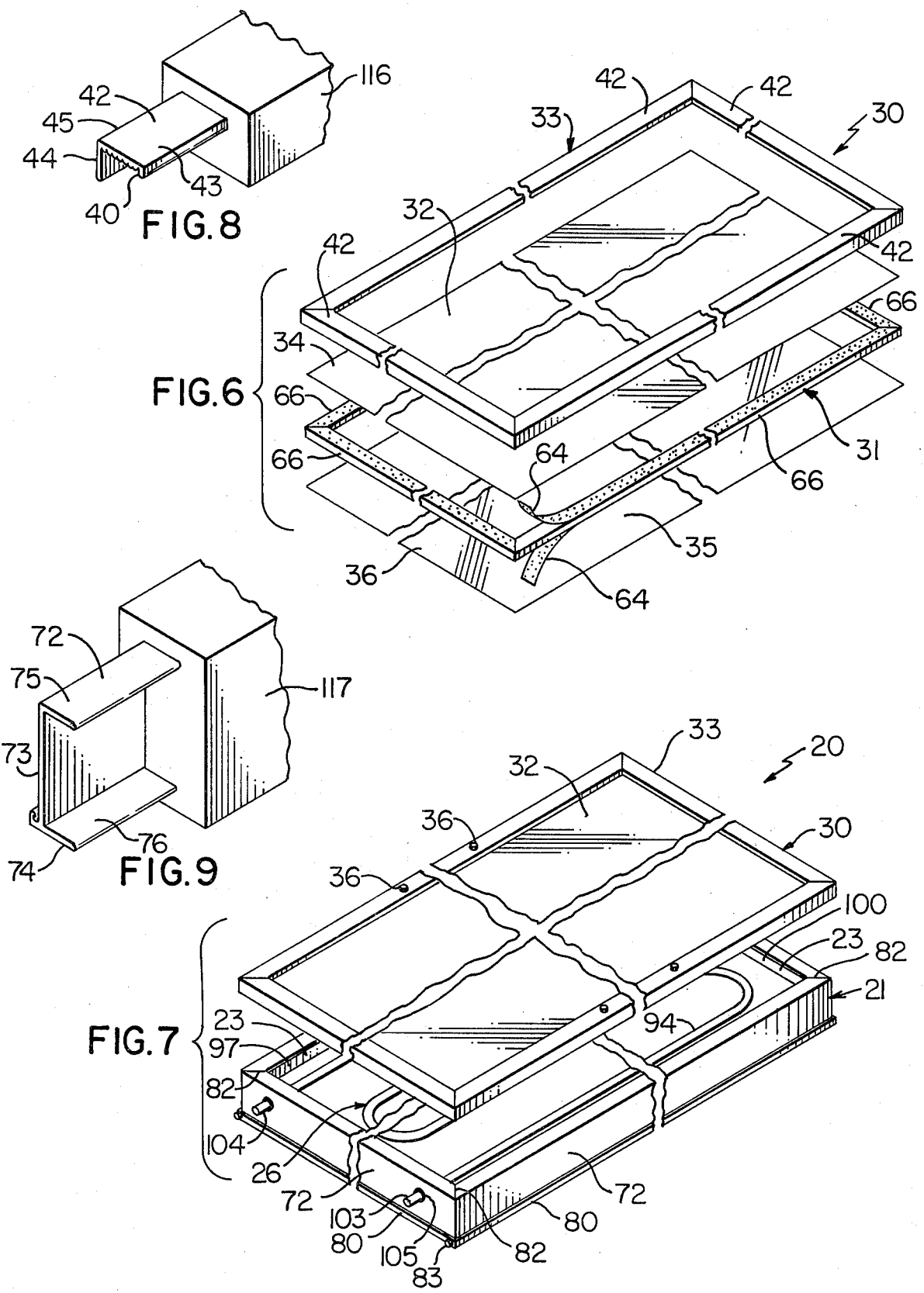

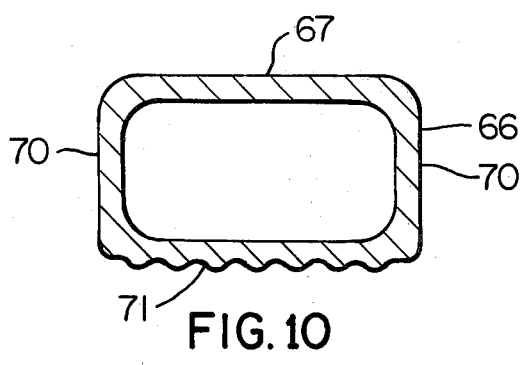
FIG.10
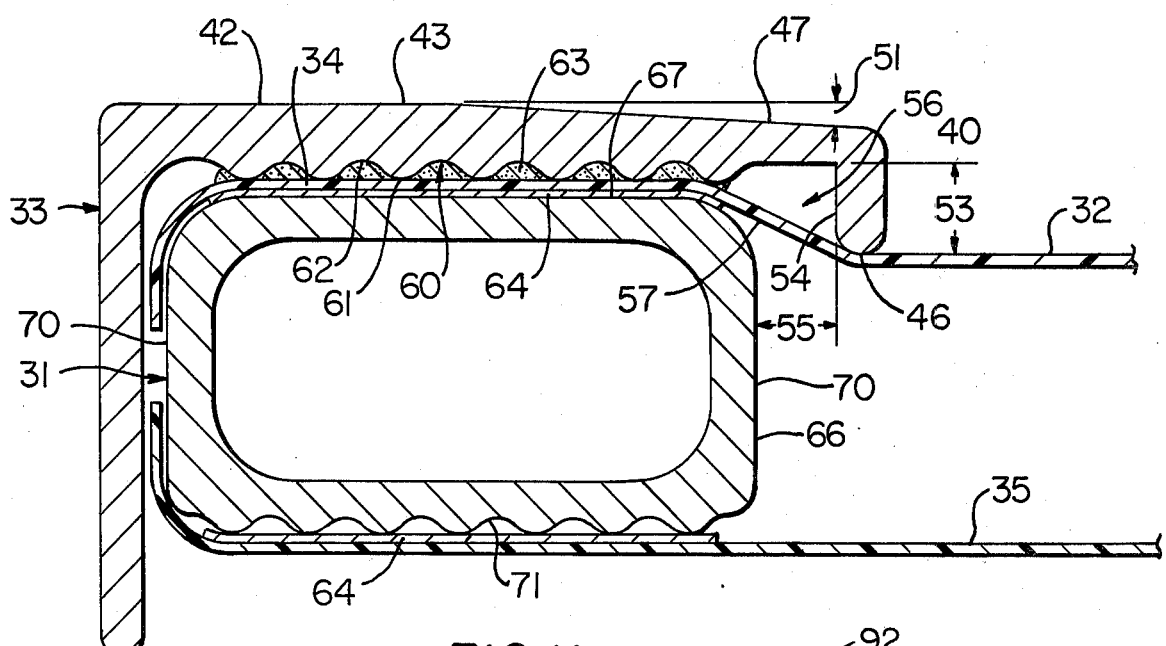
FIG.11
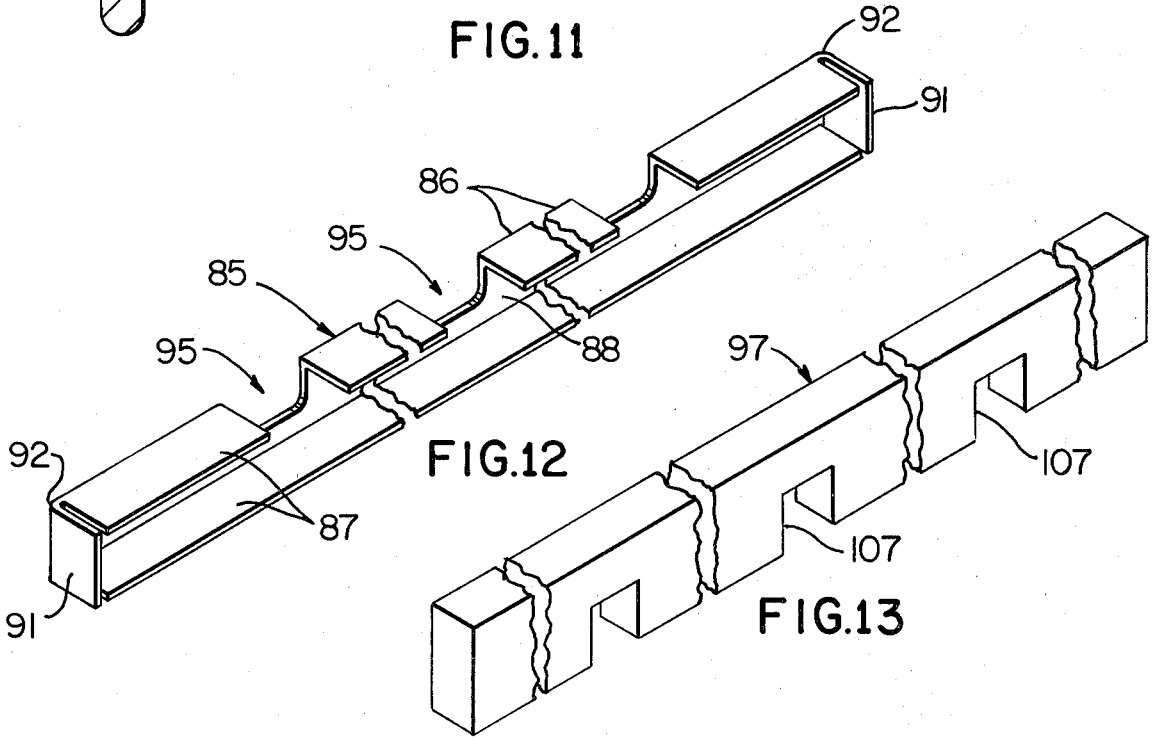
FIG.12
FIG.13

SOLAR COLLECTOR

BACKGROUND OF THE INVENTION

This invention relates to the utilization of solar energy and in particular to an improved solar collector for use in a solar heating and cooling system.

In recent years the escalating costs of fossil fuels and the worldwide realization that the supply of such fuels is not unlimited has resulted in more attention being given to alternate sources of energy including solar energy. Accordingly, there have been numerous recent proposals, in addition to the many previous proposals, for an improved solar collector.

For example, Reynolds Metals Company, of Richmond, Va., 23261, proposed (in an article appearing on pages 61 and 62 of the March 1976 issue of Modern Metals) a solar collector which employs a cover assembly provided with a top flexible cover sheet made of a polymeric material which is held on a structural frame by a retaining frame. A solar collector employing such a cover sheet is desirable for numerous reasons including reduced costs thereof.

However, a cover sheet as proposed in the above-mentioned article usually wrinkles and sags after even limited usage making it susceptible to wind-induced flutter whereby the life of such a cover sheet is substantially reduced with wind flutter. In addition, wrinkles in such a cover sheet may result in certain rays of the sun being deflected from the collector thereby reducing its efficiency. Further, a sagging cover sheet reduces the height of the air space between such cover sheet and another sheet usually provided between the cover sheet and collector whereby the thermal insulating properties of such reduced height air space are also substantially reduced. Finally, a sagging or wrinkled cover sheet results in a poor appearance which may tend to reduce the marketability of the collector using same.

It will also be noted that the solar collector proposed in the above-mentioned article utilizes a comparatively expensive peripheral supporting structure. In addition, the support means for the heat exchanger requires more parts all serving to increase the cost of the solar collector. Also, the support means for the heat exchanger disclosed in such article results in such heat exchanger being disposed in other than the optimum manner of parallel to the cover sheet thereof.

SUMMARY

This invention provides an improved solar collector which overcomes the above-mentioned deficiencies.

In particular, this invention provides an improved means for maintaining a top flexible polymeric cover sheet of a solar collector in a substantially taut condition under all ambient temperature conditions. In addition, this invention provides a solar collector having a comparatively simple and economical peripheral supporting structure and improved means for supporting a solar heat exchanger thereof in a simple high strength manner as well as in thermally insulating relation.

Further details and advantages of this invention will become apparent as the following description of the embodiments thereof in the accompanying drawings proceeds.

BRIEF DESCRIPTION OF THE DRAWINGS

The accompanying drawings show present preferred embodiments of this invention, in which FIG. 1 is a top plan view of one exemplary embodiment of a solar collector of this invention;

FIG. 2 is a fragmentary cross-sectional view taken essentially on the line 2—2 of FIG. 1;

FIG. 3 is a fragmentary cross-sectional view taken essentially on the line 3—3 of FIG. 2;

FIG. 4 is a fragmentary cross-sectional view taken essentially on the line 4—4 of FIG. 1;

FIG. 5 is a fragmentary view with parts in elevation and parts in cross section showing part of the fastening means for the peripheral supporting structure of the solar collector of FIG. 1;

FIG. 6 is an exploded perspective view of components of the cover assembly used on the collector of FIG. 1 with the central portions of such components broken away;

FIG. 7 is a perspective view of the components of the cover assembly as illustrated in FIG. 6 assembled together and showing the assembled cover assembly disposed in spaced relation above the remainder of the solar collector and with the control portions of all parts broken away;

FIG. 8 is a fragmentary perspective view particularly illustrating typical member employed to make a retaining frame portion of the cover assembly of the solar collector of FIG. 1 as made by extrusion process.

FIG. 9 is a view similar to FIG. 8 and illustrating a typical member employed to make the peripheral supporting structure of the solar collector of FIG. 1 with such member being formed by extrusion process;

FIG. 10 is a cross-sectional view of a typical tubular member employed to define the structural frame of the cover assembly of FIG. 1;

FIG. 11 is a greatly enlarged fragmentary cross-sectional view particularly illustrating details of a typical member comprising the top retaining frame of the cover assembly of FIG. 1 together with parts associated therewith;

FIG. 12 is a perspective view with parts broken away of a typical support beam comprising support means for the heat exchanger of the solar collector of FIG. 1; and FIG. 13 is a perspective view with parts broken away of a typical one of a pair of oppositely arranged side members comprising the thermally insulating side wall of the solar collector of FIG. 1.

DESCRIPTION OF ILLUSTRATED EMBODIMENTS

Reference is now made to FIGS. 1 and 7 of the drawings which illustrate an exemplary solar collector of this invention which is designated generally by the reference numeral 20 and which incorporates the teachings of this invention therein. The solar collector 20 is of high structural strength and is capable of operating efficiently over a comparatively long service life, yet such collector is inexpensive when compared to previous collectors of the same type because collector 20 is made of a minimum number of comparatively inexpensive component parts.

The solar collector 20 comprises a peripheral supporting structure which is designated generally by the reference numeral 21 (FIGS. 2, 4 and 7), a thermally insulating bottom wall 22 supported by the peripheral supporting structure 21, and a thermally insulating side wall 23 disposed against the inside surface 24 of the peripheral supporting structure and against the peripheral portion 25 of the bottom wall 22. The solar collector 20 has a solar heat exchanger 26 which is of known construction and such heat exchanger is supported above the bottom wall 22 and within the side wall 23 and such heat exchanger 26 is used in the usual manner for absorbing solar energy and heating a solar fluid (not shown) circulating therethrough. The solar collector 21 also has a simple cover assembly which is designated generally by the reference numeral 30.

Referring now to FIG. 6, the cover assembly 30 comprises a structural frame 31, a top flexible cover sheet 32 made of a suitable polymeric material disposed on the structural frame 31, and a top retaining frame 33 sandwiching peripheral edge portions 34 (FIGS. 2 and 4) of the polymeric sheet 32 on the structural frame 31. The cover assembly 30 also has a bottom flexible sheet 35 which has its peripheral portions 36 adhesively bonded to the structural frame 31 as will be described subsequently.

The retaining frame 33 is initially suitably fastened to the structural frame 31 employing a comparatively few number of fasteners 36 which for the cover assembly 30 may be as few as four fasteners 36, for example. The retaining frame 33 has integral means designated generally by the reference numeral 40 for stretching the cover sheet 32 and maintaining it taut under various ambient temperature conditions to which the solar collector 20 is likely to be subjected. After initial fastening by fasteners 36, the entire cover assembly 30 is fastened to the peripheral supporting structure 21 by a plurality of fasteners 37 causing the integral means 40 to be more fully employed to stretch the cover 32 taut and as will be discussed in more detail subsequently.

The peripheral supporting structure 21, structural frame 31, and the retaining frame 33 are preferably made of metallic materials such as lightweight metallic materials containing aluminum; and, these components have coefficients of linear expansion which are substantially greater than the coefficients of linear expansion of the polymeric sheets such as the top cover sheet 32 and the bottom sheet 35. Accordingly, once the cover assembly 30 is initially installed by screws 37 on the solar collector 20, a decrease in temperature would, except for means 40, ordinarily result in a substantial contraction of the metal components relative to the cover sheet 32, for example, thereby producing considerable slack and wrinkles in the top cover sheet 32. Wrinkles and slack in cover sheet 32 would result in a poor appearance, certain rays of the sun being deflected from the solar collector, a reduction of the air space (indicated at 41 in FIGS. 2 and 4) between the sheets 32 and 35, and increased wind flutter which would tend to fatigue the top cover 32 and reduce its service life. The improved means 40 of this invention prevents the undesirable slack and wrinkles as will be apparent from the following description.

The retaining frame 30 is comprised of a plurality of cooperating substantially L-shaped members each designated by the same reference numeral 42 even though such members 42 are of two different lengths. Each member 42 has a pair of legs 43 and 44 extending from a common bight 45 with the leg 43 having a projecting lip which, in essence, defines the stretching or tightening means 40. Each lip 40 extends generally parallel to and in the same direction as the other leg 44 of its member 42 and each lip 40 engages the cover sheet 32 to provide stretching thereof with differential expansion of the cover sheet 32 relative to metal components 21, 31, and 33.

As best seen in FIG. 11, the lip 40 has a smooth rounded terminal surface 46 which in this example is substantially semicircular in cross section and the terminal surface 46 engages the cover sheet 32 in a smooth manner to assure that the cover sheet is free of tearing forces of the type which might be produced by a sharp edge. The leg 43 of each member 42 has an outer portion 47 which is defined as roughly the outer half of such leg and adjoins the lip 40 and such outer portion 47 is resilient and provides a spring action which urges its lip 40 against the cover sheet 32 varying amounts determined by different amounts of thermal expansion and contraction of the metal components of the solar collector such as the peripheral supporting structure 21, structural frame 31, and retaining frame 33 versus the cover sheet 32.

Initially the components illustrated in FIG. 6 are fastened together as a unit as shown in FIG. 7 to define the cover assembly 30. The assembly 30 is then disposed over the peripheral supporting structure 21 with a gasket 49 made of a suitable polymeric material, such as polyvinyl chloride foam, interposed between the peripheral supporting structure 21, as shown in FIGS. 2 and 4, and assembly 30 whereupon a substantial number of fasteners 37 are employed to fasten the cover assembly 30 to the peripheral supporting structure. The fasteners 37 may be self-drilling fasteners of any type known in the art.

Once the fasteners 37 are fastened in position each peripheral downwardly projecting lip 40 provides a stretching action thereby stretching the cover sheet 32 with an initial particular desired tautness. This initial tautness is determined, in part, by the resilient outer portion 47 of each leg 43 of each member 42. The resiliency of each portion 47 may be controlled by providing a taper in the outer portion of each member 42 as illustrated in an exaggerated manner at 51 in FIG. 11 whereby such taper results in each outer portion having a gradually decreasing thickness as it approaches its lip 40. Once the cover assembly 30 is fastened in position utilizing the fastening screws 37, the gradually decreasing thickness of the outer portion 47 of each leg 43 together with the material selected to make each member 42 and the material used to make the cover sheet 32 plus the thickness of such sheet 32 results in each projecting lip 40 being initially in what may be considered a yielding or spring condition. In the event of increased temperature and substantial expansion of the previously mentioned metal components of the solar collector 20 the cover sheet 32 is merely made more taut. With a decrease in temperature and comparatively greater contraction of such metal components the built in or initial spring condition provided in each resilient outer portion 47 results in such initial spring condition being used to tighten the cover sheet 32 to prevent any slack from forming therein. With this construction the means for stretching the cover sheet 32, as defined by the projecting lip 40, results in the cover sheet 32 being maintained taut under all temperature conditions to which the solar collector 20 is likely to be subjected.

As best seen in FIG. 11 each lip 40 extends from its leg 43 a particular distance 53 and each lip 40 has an inside surface 54 which is disposed in spaced relation from an immediately adjacent surface of part of the structural frame by a distance 55 which is approximately equal to the distance 53 to thereby provide an annular gap 56 between the structural frame 31 and the projecting lip 40 extending from members 42 with the gap 56 having a stretched roughly frustopyramidal inner portion 57 of the cover sheet 32 extending thereacross. The frustopyramidal portion 57 of the cover sheet 32 varies as it is angular relationship with the adjoining central part of cover sheet 32 depending upon the positions of the resilient outer portions 47 of legs 43.

Each member 42 has an undulating inside surface 60 defining the inside surface of its leg portion 43 and such undulating inside surface 60 is defined by alternating projections 61 and recesses 62. Adhesive means 63 is disposed between the polymeric outer cover sheet 32 and the undulating inside surface 60 and such adhesive means or adhesive 63 is preferably in the form of a room temperature vulcanizing rubber adhesive which bonds the cover sheet 32 to the retaining frame 33 and the adhesive 63 is commonly referred to as an RTV adhesive. The adhesive provides the desired adherence for an extended service life of the solar collector at the extremes of temperatures likely to be encountered by such adhesive 63 including low ambient temperatures of arctic regions and high ambient temperatures of desert regions.

A suitable adhesive means is also preferably provided between the cover sheet 32 and the structural frame 31 and such adhesive means may be in the form of an adhesive tape 64 having adhesive on both of its opposed surfaces (FIGS. 6 and 11). A substantially identical adhesive means or adhesive tape 64 is provided between the structural frame 31 and the polymeric sheet 35.

As previously mentioned, the cover assembly 30 is also comprised of the structural frame 31 and although any suitable structural components may be used to define such a frame the structural frame is preferably defined by a plurality of tubular structural members each designated by the same reference numeral 66 and each having a typical cross section as shown in enlarged view in FIG. 10. Each member 66 is preferably of generally rectangular tubular outline having a smooth substantially flat top surface 67, opposed substantially flat side surfaces 70, and a bottom undulating surface 71 which is similar to the undulating surface 60 provided on the leg portions 43 of members 42. The undulating surface 71 of each member 66 enables improved fastening of the polymeric sheet 35.

As previously mentioned the solar collector 20 has a peripheral supporting structure 21 and such supporting structure 21 is defined by a plurality of single-piece members having substantially the same cross-sectional configuration and for simplicity each of such members is designated by the same general reference numeral 72, even though such members are of different lengths in the exemplary rectangular solar collector 20. In particular, it will be seen from FIGS. 2 and 4 that each member 72 is defined by a planar bight 73 adjoined at opposite ends thereof by a bottom 74 and a top 75 leg wherein the legs 74 and 75 are disposed in parallel relation and perpendicular to the bight 73.

The bottom legs 74 of members 72 have inside surfaces 76 supporting the bottom wall 22 thereon and the top leg 75 is the sole means supporting the cover assembly 30 thereon. The bottom and top legs 74 and 75 are of equal length which is preferably equal to the thickness indicated at 77 of the side wall 23 and with this construction and arrangement the top leg 75 serves to protect the entire thickness of the thermally insulating side wall 23. The thermally insulating bottom wall 22 and the thermally insulating side wall 23, with side wall 23 being comprised of a plurality of portions as will be subsequently described, are made of material selected for its thermal insulating properties. The structural strength for collector is provided primarily by the peripheral supporting structure 21.

The structure 21 is defined by members 72 which are suitably joined employing any suitable means and such means may be achieved solely by using projecting flanges 80 each of which extends in an opposite direction from a leg 74 of its associated member 72. Each projecting flange 80 defines a fastening screw receiving recess 81 therein. The members 72 are preferably mitered or beveled at their opposite ends as shown at 82 in FIG. 7, for example, and fastening screws 83, as shown in FIG. 5, are threadedly fastened in each corner thereof. It will also be appreciated that in addition to or in lieu of the screws 83 the single-piece U-shaped members 72 may be fastened by welding, brazing, or the like.

Reference is now made to FIGS. 2 and 4 of the drawings which illustrate improved support means designated generally by the reference numeral 84 for the heat exchanger 26 of solar collector 20. The support means 84 comprises a plurality of single-piece support beams each designated generally by the same reference numeral 85, also see FIG. 12, of the drawings with such beams extending between opposed parallel portions of the side wall 23. Each support beam 85 has a central portion 86 of primarily C-shaped cross-sectional configuration defined by a pair of parallel arms each designated by the same reference numeral 87 and each connected at an associated end thereof by a transverse leg 88 and it will be seen that in this example of the invention the leg 88 is disposed substantially perpendicular to bottom wall 22 and hence fins 90 of the heat exchanger 26 with the parallel arms 87 being disposed parallel to such bottom wall 22 and the fins 90. It will also be seen that the transverse leg 88 has integral extensions 91 at opposite ends thereof which are interconnected to such leg by arcuate portions 92 and each extension 91 is disposed perpendicular to transverse leg 88.

The heat exchanger 26 of this example is a tube and fin exchanger and as indicated has integral fins 90. The fins 90 are attached to portions of each top arm 87 by fastening screws 93 which may be self drilling. It will also be seen the heat exchanger 26 has an integral tube portion 94 and that cutouts 95 are provided in the support beams 85 for receiving the tube portion 94 therewithin, as illustrated in FIG. 2. The cutouts 95 enable the heat exchanger 26 to be supported substantially parallel to the bottom wall 22 and planar taut cover sheet 32 disposed parallel to wall 22.

As previously mentioned the solar collector 20 has thermally insulating side wall 23 and such thermally insulating side wall is comprised of a plurality of portions or members which in this example of the invention include a pair of substantially identical side members each designated by the same reference numeral 97 and with one of such side members being illustrated in FIG. 13 of the drawings. The thermally insulating side wall 23 also has a pair of end members each designated by the same reference numeral 100, see FIGS. 4 and 7.

One of the end members 100 has a pair of openings 101 therethrough which are aligned with associated openings 102 in an end member 72 for receiving an inlet pipe 103 connected to the inlet of the tube portion 94 and an outlet pipe 104 connected to the outlet of the tube portion 94. A suitable annular grommet 105, a typical one being illustrated in FIG. 4, is provided between each pipe 103 and 104 and its opening 102 in its U-shaped structural member 72 to thereby provide air seals where pipes 103 and 104 respectively enter and exit the solar collector 20. The other end member is a rectangular parallelopiped, like the above-described end member, but is free of openings or the like.

The side members 97 of wall 23 are substantially identical and it will be seen that basically each of such members is in the form of a rectangular parallelopiped having cutout slots 107 therein with each slot also being in the form of a rectangular parallelopiped. Each cutout slot 107 is particularly adapted to receive a comparatively more rigid member 110 made of a suitable polymeric material; and, each member 110 serves as a thermal insulating and spacer block between an associated end of a support beam 85 and member 72. In particular, with the side members 97 in place and blocks 110 in their slots 107, the support beams 85 are disposed therebetween whereupon a plurality of fastening screws, preferably in the form of self-drilling fasteners 111, are each extended through the bight 73 of an associated U-shaped structural member 72, thermal block 110, and tab 91 to thereby support each beam 85 at its opposite ends employing integral extension tabs 91. With this construction and arrangement the heat exchanger 26 is completely supported in thermally insulated relation and the entire support function is achieved by the peripheral supporting structure 21.

To assure that the support beams 85 do not rest on the bottom wall 22 and are provided with a suitable air space as indicated at 113 between each beam 85 and the top surface of the bottom wall 22, a plurality of suitable spacers 114 are suitably adhered or otherwise fixed to the bottom arm 87 of the support beam 85. The spacers 114 may be made of any suitable polymeric material such as a plastic material, rubber, or other material which is usable as a thermal insulator and yet capable of providing the desired spacing function. The spacers 114 serve to space the support beams 85 above the bottom wall 22 until the self threading fasteners 111 can be fastened into position.

The members 42 defining the retaining frame 33 are preferably made of a suitable metallic material such as an aluminous material and preferably by extrusion process. For example, an aluminous material may be extruded employing suitable extruder 116 as illustrated in FIG. 8 to define an extruded stock member, which is also designated by the reference numeral 42, and is used to define the various members 42 comprising such retaining frame. Similarly, it will be appreciated that the substantially U-shaped members 72 defining the peripheral supporting structure 21 are preferably made of a suitable metallic material, such as an aluminous material and preferably by extrusion process. Thus, a typical stock member may be extruded using an extrusion apparatus 117 (FIG. 9) and also designated by the same reference numeral 72.

It will also be appreciated that the tubular members 66 comprising the structural frame 31 and the support beams 85 of support means 84 may be similarly made by extrusion process. However, it is to be understood that the members 42, 66, 72, and 85 may be made by any other suitable technique or process known in the art. However, regardless of how made, these members are preferably made of light-weight high-strength materials such as aluminous materials due to the usual installation of solar collector 20 on a roof structure, or the like.

The sheets 32 and 35 have been described as being made of flexible polymeric material; and, any suitable material may be used to make same. In one exemplary embodiment of this invention the sheet 32 was made of a polyester film having a thickness of roughly 0.007 inch with such film being dye treated to prevent deterioration thereof due to ultraviolet light from the sun. In this same exemplary embodiment the sheet 35 was made of a fluorocarbon resin and had a thickness of roughly 0.001 inch.

While present exemplary embodiments of this invention, and methods of practicing the same, have been illustrated and described, it will be recognized that this invention may be otherwise variously embodied and practiced within the scope of the following claims.

What is claimed is:

1. In a solar collector having a cover assembly comprising a structural frame, a flexible polymeric cover sheet disposed on said structural frame and a top retaining frame sandwiching peripheral edge portions of said polymeric cover sheet, the improvement wherein said retaining frame comprises at least one substantially L-shaped member having a pair of legs extending from a common bight, one of said legs of said member having a projecting lip that extends generally parallel to and in the same direction as the other leg or said member and engages said cover sheet to provide stretching thereof and to maintain said cover sheet taut under various ambient temperature conditions.

2. In a solar collector having a cover assembly comprising a structural frame, a flexible polymeric cover sheet disposed on said structural frame and a top retaining frame sandwiching peripheral edge portions of said polymeric cover sheet on said structural frame, said retaining frame including means on said retaining frame stretching said cover sheet and maintaining said cover sheet taut under various ambient temperature conditions, the improvement wherein said retaining frame is defined by a plurality of cooperating substantially L-shaped members, each of said members having a pair of legs extending from a common bight, one of said legs of each member having a projecting lip which extends generally parallel to and in the same direction as the other leg of its member and engages said cover sheet to provide stretching thereof and to maintain said cover sheet taut under various ambient temperature conditions.

3. In a solar collector as set forth in claim 2 the further improvement wherein each lip has a smooth rounded terminal surface which engages said cover sheet free of tearing forces thereon.

4. In a solar collector as set forth in claim 2 the further improvement wherein said one leg of each member of said retaining frame has an undulating inside surface defined by alternating projections and recesses and a room temperature vulcanizing adhesive bonding said cover sheet to said retaining frame, said adhesive coating the outside surfaces of said projections and filling said recesses to provide adherence between said cover sheet and retaining frame for an extended service life at the extremes of temperatures likely to be encountered by said adhesive.

5. In a solar collector as set forth in claim 2 the further improvement wherein said one leg of each member has an outer portion adjoining said lip which is resilient and provides a yielding spring action which continuously urges its lip against said cover sheet to compensate for different amounts of thermal expansion and contraction of said cover sheet versus the remaining structural parts of said solar collector.

6. In a solar collector as set forth in claim 5 the further improvement wherein each of said outer portions has a gradually decreasing thickness towards its lip.

7. In a solar collector as set forth in claim 5 the further improvement wherein each lip extends from its leg a particular distance and each lip has an inside surface disposed in spaced relation from an immediately adjacent part of said structural frame by a distance approximately equal to said particular distance to provide an annular gap between said structural frame and the projecting lips from said members, said gap having a stretched roughly frustopyramidal portion of cover film extending thereacross.

8. In a solar collector having a cover assembly comprising a structural frame, a flexible polymeric cover sheet disposed on said structural frame and a top retaining frame sandwiching peripheral edge portions of said polymeric cover sheet on said structural frame, said retaining frame including means on said retaining frame stretching said cover sheet and maintaining said cover sheet taut under various ambient temperature conditions, the improvement comprising a room temperature vulcanizing adhesive bonding said cover sheet to said retaining frame, said adhesive providing adherence for an extended service life at the extremes of temperatures to which said adhesive is likely to be subjected.

9. In a solar collector having a metal peripheral supporting structure, a thermally insulating bottom wall supported by said structure, a thermally insulating side wall disposed against said structure and the peripheral portion of said bottom wall, a solar heat exchanger supported above said bottom wall and within said side wall for absorbing solar energy and heating a solar fluid circulating therethrough and a cover assembly for said collector attached to said supporting structure, said cover assembly having a structural frame, a top flexible polymeric cover sheet disposed on said structural frame and a top retaining frame sandwiching periphical edge portions of said polymeric sheet on said structural frame and a top retaining frame sandwiching periphical edge portions of said polymeric sheet on said structural frame, the improvement wherein said peripheral supporting structure is comprised solely of a plurality of single-piece members having substantially the same U-shaped cross-sectional configuration, said single-piece members being fixed together to define said peripheral supporting structure and wherein said retaining frame includes means on said retaining frame stretching said cover sheet and maintaining said cover sheet taut under all temperature conditions.

10. In a solar collector as set forth in claim 9 the further improvement comprising support means for said heat exchanger carried solely by said peripheral supporting structure and supporting said heat exchanger in thermally insulated relation.

11. In a solar collector having a peripheral supporting structure, a thermally insulating bottom wall supported by said structure, a thermally insulating side wall of a particular thickness disposed against said structure and the peripheral portion of said bottom wall, a solar heat exchanger supported above said bottom wall and within said side wall for absorbing solar energy and heating a solar fluid circulating therethrough and a cover assembly for said collector attached to said peripheral supporting structure, said cover assembly having a structural frame, a flexible polymeric cover sheet disposed on said structural frame and a top retaining frame sandwiching peripheral edge portions of said polymeric cover sheet on said structure frame, the improvement comprising a plurality of single-piece members having substantially the same cross-sectional configuration fixed together to define said peripheral supporting structure, each of said members having a U-shaped cross-sectional configuration defined by a planer bight adjoined at opposite ends thereof by a bottom and a top leg disposed in parallel relation and perpendicular to said bight, said bottom legs of said members having inside surfaces supporting said bottom wall thereagainst, said top leg being the sole means supporting said cover assembly and wherein said retaining frame includes means on said retaining frame stretching said cover sheet and maintaining said cover sheet taut under various ambient temperature conditions.

12. In a solar collector as set forth in claim 11 the further improvement wherein said bottom and top legs are of equal length which is substantially equal to said particular thickness of said side wall, said top leg serving to protect the entire thickness of said side wall.

13. In a solar collector as set forth in claim 11 the further improvement comprising support means for said heat exchanger carried solely by the bights of associated U-shaped members.

14. In a solar collector as set forth in claim 13 the further improvement wherein said support means comprises at least one single-piece support beam extending between opposed portions of said side wall, said support beam having a central portion of primarily C-shaped configuration defined by a pair of parallel arms each connected at an associated end thereof by a transverse leg, said transverse leg having integral extension tabs at opposite ends thereof, said tabs being disposed perpendicular to said arms and leg.

15. In a solar collector as set forth in claim 14 the further improvement wherein said opposed portions of said side wall have at least a pair of cutouts therein and said support means further comprises a pair of thermal insulating blocks made of a polymeric material disposed in said cutouts and each having an associated extension tab thereagainst, and a pair of self drilling fasteners each extending through an associated bight, thermal insulating block, and extension tab to thereby support said support beam by its extension tabs and in thermally insulated relation.

16. In a solar collector as set forth in claim 15 the further improvement comprising a plurality of polymeric spacers between said bottom wall and support beam defining an air space therebetween.

17. In a solar collector as set forth in claim 15 wherein said solar heat exchanger is a tube-fin heat exchanger having the fins thereof normally disposed substantially in a common plane before installation of said heat exchanger in said solar collector, the further improvement comprising cutouts in said support beam for receiving tube portions of said heat exchanger enabling said tube portions to be disposed therewithin and said fin portions to remain disposed in their common plane with said heat exchanger installed in said solar collector.

* * * * *